United States Patent [19]

Sheckler et al.

[11] Patent Number: 5,114,584

[45] Date of Patent: May 19, 1992

[54] FILTER DRYER BODY

[75] Inventors: Chad A. Sheckler, Newark; Jeffrey J. Yost, Clifton Springs, both of N.Y.

[73] Assignee: Refractron Technologies Corporation, Newark, N.Y.

[21] Appl. No.: 626,952

[22] Filed: Dec. 13, 1990

[51] Int. Cl.⁵ .............................................. B01D 69/00
[52] U.S. Cl. ..................................... 210/490; 210/496; 210/500.1; 210/500.25; 210/500.26
[58] Field of Search ............... 210/403, 496, 767, 282, 210/505, 500.25, 500.26, 490; 55/179, 158

[56] References Cited

U.S. PATENT DOCUMENTS

| 3,573,158 | 3/1971 | Pall et al. . | |
|---|---|---|---|
| 4,650,575 | 3/1987 | White, Jr. | 210/403 X |
| 4,665,050 | 5/1987 | Degen et al. | 210/496 X |

Primary Examiner—Frank Spear
Attorney, Agent, or Firm—Howard J. Greenwald

[57] ABSTRACT

A filter body comprised of at least about 75 weight percent of molecular sieve material and from about 9 to about 20 weight percent of nylon is disclosed. This filter body has a density of from about 10 to about 25 grams per cubic inch, a compressive strength of at least about 500 pounds per square inch, a pressure drop of from about 5 to about 20 inches, a water pickup of at least about 11 weight percent, and an initial 24-hour water pickup of at least about 6 weight percent.

17 Claims, 2 Drawing Sheets

FILTER DRYER BODY

FIELD OF THE INVENTION

A porous, adsorbent filter body containing molecular sieve material and nylon.

BACKGROUND OF THE INVENTION

Bonded molecular sieve materials of the zeolite family are well known to those skilled in the art. These natural and synthetic materials, having different particle sizes and pore sizes, are hydrated metal alumino silicates.

It has been known for many years that molecular sieves have excellent adsorptive properties. Thus, molecular sieve materials have been used in desiccant filters. These desiccant filters have often been comprised of a metallic cartridge or vessel filled with loose, activated particles of sorbent, such as molecular sieve material. However, as is disclosed in U.S. Pat. No. 3,235,089 of Burroughs, the use of such loose sorbent particles has the following disadvantages: "(1)a tendency to develop channels, (2)attrition between individual particles which causes powdering and packing with a resultant change in the penetrability of the unit and also a lessening of desiccant properties, and (3)formation of strata in the bed due to classification which occurs during use . . . (see column 1, lines 21-30)"

Because of the problems with the use of loose sorbent particles in desiccant filters, attempts have been made to produce monolithic filter bodies of molecular sieve material. However, the prior art discloses that it is very difficult to make a filter body high in molecular sieve content which will effectively utilize the adsorptive properties of these materials.

In 1961, in U.S. Pat. No. 2,973,327, Mitchell et al. disclosed that it is difficult to agglomerate molecular sieve because ". . . the alkalinity of the sieve . . . tends to destroy or weaken many common types of binders . . . . In the presence of water, the molecular sieves dilate and thus resist compaction forces . . . (see column 1, lines 57-63)"

In 1962 it was disclosed that filter bodies which contained a substantial amount of molecular sieve material are ineffective. In his U.S. Pat. No. 3,025,233, Figert disclosed (at lines 61-66 of column 3) that ". . . crystalline zeolite molecular sieves have . . . limited filtering ability, when used alone, to provide full fluid flow with a negligible pressure drop and provide the retention of finely divided particulate matter . . . . " Figert's solution to this problem was to provide a porous barrier which contained from 7 to 31 percent of a crystalline zeolite molecular sieve, from 39 to 93 percent of activated alumina, and an inert binder which could be organic or inorganic.

By no later than 1966 it was recognized that prior art binding techniques were ineffective in making shaped bodies consisting of molecular sieve. In their U.S. Pat. No. 3,262,890 of Mitchell et al., the patentees taught (at lines 34-42 of Column 1) that "The prior art has employed shaped molecular sieve bodies consisting of hydrated alumina particles and 5 to 10 percent zeolite 4A particles with cellulose acetate or calcium aluminate. These bodies or blocks are shaped to fit in the sealed refrigerant cartridges. However, when the blocks are sectioned, it is found that the molecular sieve particles are quite easily dislodged from the mass." The patentees also disclosed (at lines 47-56 of column 1) that "Attempts to bind 14×30 mesh zeolite type 4A particles with calcium aluminate cement, or calcium aluminate and sodium silicate have proved unsuccessful. It appears that the alkaline nature of the molecular sieve particles adversely affects the binders, and that conventional binding techniques are not suitable for preparing shaped bodies containing uniformly dispersed molecular sieves." The solution to this problem presented in U.S. Pat. No. 3,262,890 was to provide a green body containing clay mineral binder and sodium silicate and to thereafter fire this body at a temperature of from about 662 to about 1,202 degrees Fahrenheit.

By no later than 1969, another problem with the use of molecular sieve material was recognized. In his U.S. Pat. No. 3,446,645, Wilfred Drost disclosed (at lines 45-49 of column 1) that ". . . under some conditions, halogenated derivatives of ethane and methane employed as refrigerant gases are decomposed to some extent by a number of prior known molecular sieve agglomerates used as desiccants in the system."

This decomposition problem was again referred to in 1970. In their U.S. Pat. No. 3,536,521, Robert W. McKinney et al. disclosed (at lines 35-40 of column 1) that ". . . the Freons . . . used in refrigerant systems react at active sites on a molecular sieve surface with subsequent decomposition into halogen acids which react with the basic structure of the molecular sieve."

A self-supporting structure containing molecular sieve and thermoplastic material was disclosed in U.S. Pat. No. 4,665,050 of Degen et al. In the process of this patent, a sorbent (such as molecular sieve) with a particle size in the range of from 1 to 10 millimeters was preheated, and the preheated particles were then mixed with from about 1 to about 7 weight percent of thermoplastic binder (such as polyethylene); thereafter, the sorbent/binder mixture was heated to about the solid-liquid transition temperature of the binding material. The body formed by this process, however, has poor mechanical properties.

It is an object of this invention to provide an integral, porous body which contains at least about 75 weight percent of molecular sieve material.

It is another object of this invention to provide a filter body with excellent filtering properties."

It is another object of this invention to provide a filter body with excellent strength properties.

It is another object of this invention to provide a filter body with excellent desiccant properties.

It is another object of this invention to provide a filter body which is entirely compatible with refrigerant fluids.

It is yet another object of this invention to provide a filter body which will retain its mechanical properties even after it has been contacted with refrigerant fluid for a substantial period of time.

It is yet another object of this invention to provide a process for bonding a molecular sieve composition to a substrate, such as metal.

It is yet another object of this invention to provide a composite article comprised of molecular sieve material bonded to a substrate.

SUMMARY OF THE INVENTION

In accordance with this invention, there is provided a porous filter body comprised of at least about 75 weight percent of molecular sieve and at least about 9 weight percent of nylon.

BRIEF DESCRIPTION OF THE DRAWINGS

The present invention will be more fully understood by reference to the following detailed description thereof, when read in conjunction with the attached drawings, wherein like reference numerals refer to like elements, and wherein.

DESCRIPTION OF THE PREFERRED EMBODIMENTS

In the process of this invention, a molecular sieve material is mixed with a nylon material.

As used in this specification, the term molecular sieve refers to a microporous material belonging to the zeolite family of minerals and synthetic compounds characterized by an aluminosilicate tetrahedral framework, ionexchangeable large cations, and loosely held water molecules permitting reversible dehydration. See, e.g., pages 696-698 of Volume 14 of the "McGraw-Hill Encyclopedia of Science & Technology" (McGraw-Hill, Inc., New York, 1977), the disclosure of which is hereby incorporated by reference into this specification.

The activated molecular sieve material used in the process of this invention preferably has the formula $M_{2/n}O:Al_2O_3:SiO_2$, wherein: (1) M is a metal ion preferably selected from the group consisting of sodium, potassium, calcium, strontium, barium, cesium, magnesium, and mixtures thereof, and (2) n is the valence of the metal ion and is selected from the group consisting of 1 and 2.

When the molecular sieve is activated, it becomes dehydrated and contains substantially no water. When it is not activated, it may be represented by the formula $M_{2/n}O:Al_2O_3:SiO_2:H_2O$.

The zeolite family of minerals is well known to those skilled in the art. Thus, e.g., some members of this family include Analcime (M is Na), Wairakite (M is Ca), Pollucite (M is Cs), Edingtonite (M is Ba), Thomsonite (M is Na, Ca), Phillipsite (M is K, Na), Garronite (M is Na, Ca), Brewsterite (M is Sr), Ferrierite (M is Na, Mg), Paulingite (M is K, Ca), and the like.

In one preferred embodiment, M is selected from the group consisting of sodium, potassium, and mixtures thereof.

It is preferred that the molecular sieve material used in the process of this invention contain less than about 30 weight percent of $M_{2/n}O$, less than about 50 weight percent of silicon oxide, and less than about 40 weight percent of aluminum oxide, each by weight of the activated molecular sieve material.

In one preferred embodiment, the molecular sieve is a crystalline material having cubic crystals which range in size between 1 and 5 microns. The crystal structure consists basically of a three-dimensional framework of $SiO_4$ and $AlO_4$ tetrahedra, which are cross-linked by the sharing of oxygens. The electrovalence of the tetrahedra containing aluminum is balanced by the inclusion of sodium and/or potassium cations in the crystal. The configuration of the tetrahedra is such that the crystals are honeycombed with regularly spaced cavities interlaced by channels of molecular dimensions.

In one preferred embodiment, the molecular sieve used in the process of this invention has a structure such that substantially all of its pores are smaller than about 4 angstroms. In another embodiment, the molecular sieve used in the process of this invention has a structure such that substantially all of its pores are larger than about 4 angstroms. In yet another embodiment, the molecular sieve used in the process of this invention has a structure such that some of its pores are smaller than about 4 angstroms and some of its pores are larger than about 4 angstroms.

As is known to those skilled in the art, the complex crystals of molecular sieves form cages which are the basis of molecular adsorption, whereby adsorbed molecules occupy these cages. Thus, for example, potassium and sodium ions in the crystal cages give the cage opening different sizes, allowing "sieving" of different sized molecules. The potassium ion makes the cage opening about 3 angstroms in diameter. The sodium ion makes the cage opening about 4 angstroms in diameter. See, for example, Zeochem Bulletin No. Zi088, "Zeochem Molecular sieves for the natural gas, petroleum refining, and petrochemical industry" (Zeochem Company, Louisville, Ky.), the disclosure of which is hereby incorporated by reference into this specification.

The molecular sieve material used in the process of this invention has a particle size distribution such that substantially all of its particles pass through a 9 mesh screen (2,000 microns) and are retained on a 60 mesh screen (250 microns); this material is referred to as having a 9×60 particle size. In other embodiments, the particle size of the sieve material is 9×20(841 microns), 16 (1,000 micron) ×40, 20×40, and the like. Molecular sieves with pore sizes smaller than about 4 angstroms are well known to those skilled in the art and may be purchased from many different vendors.

By way of illustration, one may use "Molecular Sieve Type 4AXH 6," "Molecular Sieve Type 4AXH 7," and "Molecular Sieve Type 4AXH 9" each of which is available from the UOP Molecular Sieves of 25111 Country Club Boulevard, North Olmstead, Ohio.

By way of further illustration, one may use a Zeochem Molecular Sieve Type 4A. This material has the formula $Na_2O.Al_2O_3.2SiO_2.XH_2O$, a nominal pore diameter of 4 angstroms, a cubic crystal structure, a bulk density of 46 pounds per cubic foot, a theoretical equilibrium water capacity of 24 weight percent, and a water content (as shipped) of 1.5 weight percent (maximum).

By way of further illustration, one may use a Zeochem Molecular Sieve Type 3A. This material has the formula $(K_2O.Na_2O).Al_2O_3.2SiO_2.XH_2O$, a nominal pore diameter of 3 angstroms, a cubic crystal structure, a bulk density of 47 pounds per cubic foot, a theoretical equilibrium water capacity of 21 weight percent, and a water content (as shipped) of 1.5 weight percent (maximum).

In the process of this invention, the molecular sieve material is preferably mixed with a nylon material.

As used in this specification, the term nylon (or "polyamide") refers to a melt-processible thermoplastic whose chain structure features repeating amide groups.

As is known to those skilled in the art, there are two general classes of nylon. The first class of nylons are those polymerized by the condensation of a dibasic acid ($HOOC-R_1-COOH$) and a diamine ($H_2N-R_2-NH_2$). Thus, for example, Nylon-6/6 is polymerized from adipic acid ($R_1$ is alkyl containing 4 carbon atoms) and hexamethylene diamine ($R_2$ is alkyl containing 4 carbon atoms). Other commercially available nylons made this way from combinations of hexamethylene diamine and azelaic, sebacic, or dodecanedioc acids are types --6/9, -6/10, and -6/12, respectively.

The second class of nylons are those polymerized by addition reactions of ring compounds that contain both acid and amine groups on the monomer; see, e.g., pages 30-33 of the "Modern Plastics Encyclopedia," mid-October 1990 issue of Modern Plastics, Volume 67, Number 11 (Modern Plastics, Highstown, N.J.), the disclosure of which is hereby incorporated by reference into this specification. An example of this second class is Nylon-6, which is polymerized from e-caprolactam.

As is known to those skilled in the art, the commercially available nylons include Nylon-6, Nylon-6/6, Nylon-6/9, Nylon-6/12, Nylon-11, and Nylon-12.

By way of illustration, one may use nylon 11. This nylon is a polycondensation product of aminoundeconoic acid, which is made a complex process from the recinoleic acid of castor oil. Originally marketed in France under the tradename of "CORVEL," it is sold in the country by Morton International of Reading, Pa. as product number 78-1001.

By way of illustration, one may use nylon 12. This material is a lauro lactam made from butadiene. It is sold by, e.g., Modern Dispersions Incorporated of Leominster, Mass.

It is preferred that the nylon (and/or the other thermoplastic material) used in the process have a particle size such that substantially all of its particles are smaller than about 100 microns and, preferably, 75 microns.

In one embodiment, the nylon (and/or other thermoplastic material) used in the process preferably has a decomposition point in excess of 570 degrees Fahrenheit. As is known to those skilled in the art, the term "decomposition temperature" refers to that temperature which causes a substantial amount of discoloration in the nylon. Without wishing to be bound to any particular theory, applicants believe that such thermally-caused discoloration is due to disassociation of the nylon amine groups from the carbon atoms.

In place of the nylon material, or in addition thereto, one may use other thermoplastic materials.

By way of illustration, one may use powdered tetrafluoroethylene, also often referred to as "PTFE" or "TFE"). One such tetrafluoroethylene is sold by E.I. du Pont de Nemours and Company of Wilmington, Del. under the name of "TEFLON."

By way of further illustration, one may use other powdered thermoplastic fluorocarbons such as, e.g., fluorinated ethylene propylene, chlorotrifluoroethylene, and the like. These fluoroplastics are described on pages 325-327 of H. R. Clauser's "Materials Handbook," Twelfth Edition (McGraw Hill Book Company, New York, 1986), the disclosure of which is hereby incorporated by reference into this specification.

By way of further illustration, one may use a polyethylene with a density of from about 0.910 to about 0.959. These materials are described on pages 633 to 636 of said "Materials Handbook."

The composition of this invention may be made by mixing from about 9 to about 20 weight percent of said nylon (and/or other thermoplastic) with the aforementioned molecular sieve material. This mixture may be prepared by either of the two processes described below.

In one preferred process of this invention, the aforementioned molecular sieve is wetted with a deactivation agent. Thus, referring to FIG. 1, to the mixer 10 is charged molecular sieve (via line 12) and deactivation agent (via line 14).

The purpose of the deactivation agent is to deactivate the molecular sieve so that it will not react with water-containing reagents used in the process. Any of the deactivation agents known to deactivate molecular sieves can be used. Thus, by way of illustration, one may use water, an alcohol of the formula ROH wherein R is alkyl of from about 1 to 5 carbon atoms, mixtures of water and alcohol, and the like. A sufficient amount of the deactivation agent is preferably added to completely wet the surface of the molecular sieve material. Thus, e.g., in one embodiment, from about 30 to about 47 weight percent (by total weight of wetted material) of deactivation agent is added.

Figure 1:
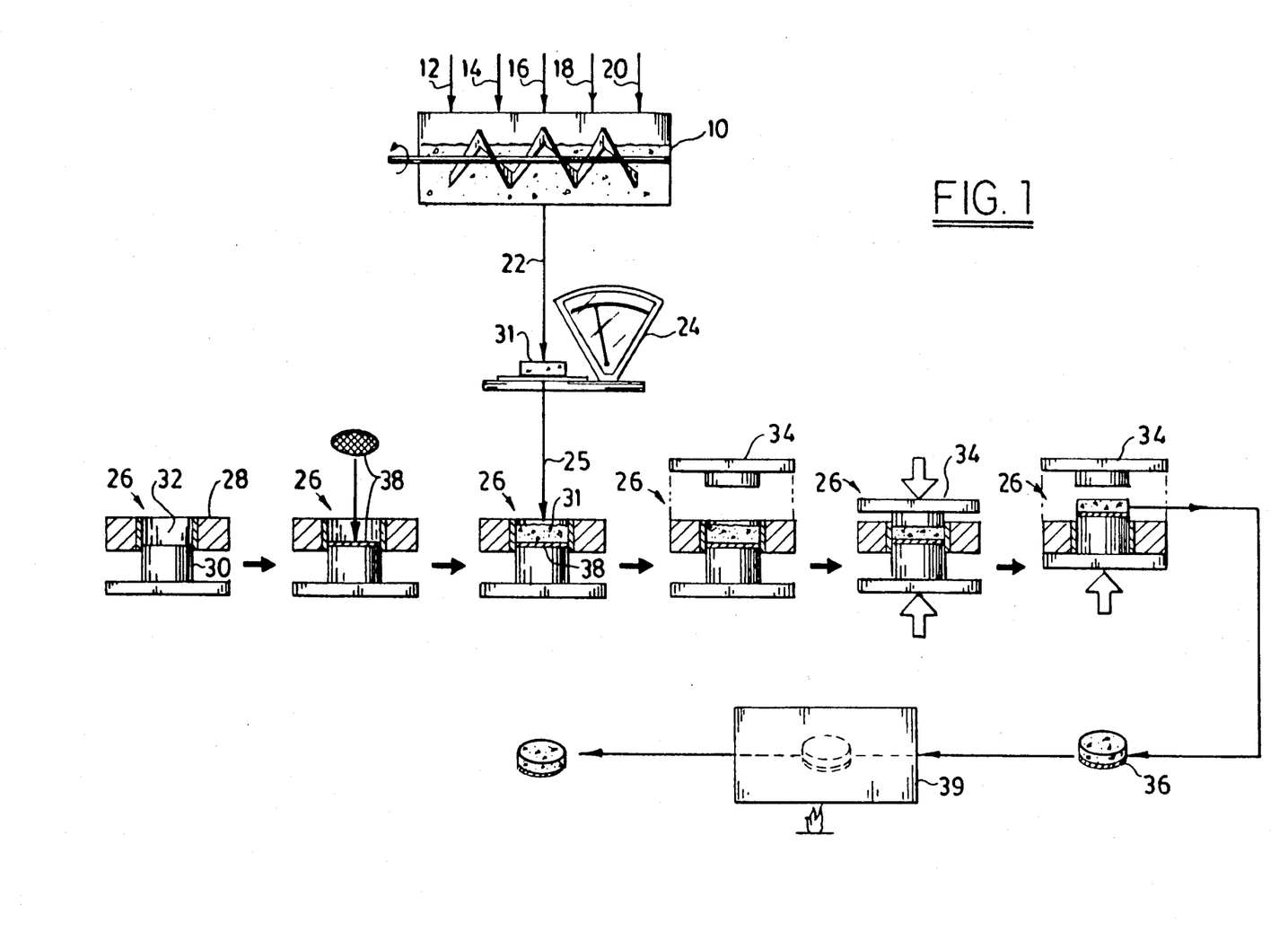
FIG. 1 is a flow diagram of a preferred (and FIG. 2 of an alternative) process of this invention.

In one embodiment, a green binder is added to the molecular sieve material along with the deactivation agent (via line 14). In another embodiment, the green binder is added separately via line 16.

In general, from about 1 to 2 weight percent of such binder is added to the mixture.

In one embodiment, it is preferred that the binder used in the process have a particle size distribution such that substantially all of its particles are smaller than about 0.1 microns. Some of these preferred colloidal binders include colloidal silica, boehmite, and the like. Thus, e.g., one suitable boehmite binder is "DISPAL" 180 (available from Vista Chemical Company of Austin, Tex.).

In one preferred embodiment, a silicone coating agent is added to coat the sieve. This coating agent may be added separately from the deactivation agent through, e.g., line 18. Alternatively, the coating agent may be added with the deactivation agent via line 16. In another embodiment, not shown, the coating agent is mixed directly with the thermoplastic material.

In general, from about 0.5 to about 4 weight percent of coating agent (by weight of water added to the mixer 10) is charged to the system.

It is preferred that the coating agent be a silicone. As is known to those skilled in the art, silicones (organosiloxanes) are a group of siloxane polymers based on a structure consisting of alternate silicon and oxygen atoms with various organic radicals. See, e.g., pages 1039-1040 of N. Sax's "Hawley's Condensed Chemical Dictionary," Eleventh Edition (Van Nostrand Reinhold Company, New York, 1987), the disclosure of which is hereby incorporated by reference into this specification.

In one preferred embodiment, the coating agent is a silicone fluid, which is a linear chain of polydimethyl siloxane. As is known to those skilled in the art, the molecular weights of these fluids will determine their viscosity. Furthermore, the properties may further be modified by replacing the pendant methyl groups by phenyl and/or trifluoropropyl and/or by other groups. See, e.g., pages 152-154 of said "Modern Plastics Encyclopedia."

In one embodiment, the coating agent is a heat stabilizing silicone fluid emulsion obtained from Union Carbide Corporation, Danbury, Conn. (as silicone fluid emulsions LE-45).

Referring again to FIG. 1, after the molecular sieve, the wetting agent, and the coating agent are charged to mixer 10, mixing occurs until a substantially homogeneous mixture occurs.

Once the mixture of molecular sieve, wetting agent, and coating agent has been formed, it is mixed with from 9 to about 14 weight percent (by total weight of mixture) of powdered thermoplastic material, such as the powdered nylon described above. This powdered thermoplastic material may be charged to mixer 10 via line 20.

After the thermoplastic material has been charged to mixer 10, the mixture so formed is mixed until a homogeneous mixture results.

The mixture of molecular sieve, water, green binder, heat stabilizing agent, and thermoplastic material is discharged via line 22 to scale 24, wherein it is weighted to a predetermined weight. Thereafter, it is transferred to press 26 wherein it is compacted in a die, using mechanical, pneumatic, or hydraulic pressure.

Referring again to FIG. 1, press 26 is comprised of case 28, bottom platen 30, press cavity 32, and top platen 34. The mixture 31 of molecular sieve, water, green binder, heat stabilizing agent, and thermoplastic material is transferred to die 32. Once mixture 31 is within press cavity 32, platen 30 and platen 34 compress it, thereby forming green body 36.

Green body 36 may consist essentially of the compressed mixture of the molecular sieve, water, green binder, heat stabilizing agent, and thermoplastic material. Alternatively, green body 36 also may contain a substrate material 38 attached to the compressed mixture of the molecular sieve, water, green binder, heat stabilizing agent, and thermoplastic material.

It is preferred that press 26 be a double-action press. The material is pressed to a given volume and density. In general, the material is pressed to a green density of from about 10 to about 26 grams per cubic inch.

The green body is then transferred to a furnace wherein it is heated to a temperature of from of 325 to 550 degrees Fahrenheit. In one preferred embodiment, wherein nylon was used as the thermoplastic material in the mixture, the temperature used is from about 450 to about 460 degrees Fahrenheit.

It is preferred that the sample be heated while it is being subjected to a reduced pressure of less than about 700 Torr. In this embodiment, it is also preferred that the sample be contacted with an inert gas selected from the group consisting of nitrogen, argon, helium, and the like while it is being heated.

In general, the sample is heated until it contains less than about 1 weight percent of moisture, and preferably, less than about 0.5 weight percent of moisture.

The dried sample is then removed from the furnace and packaged into a sealed container.

ALTERNATIVE PROCESS FOR MAKING THE POROUS BODY

Figure 2:
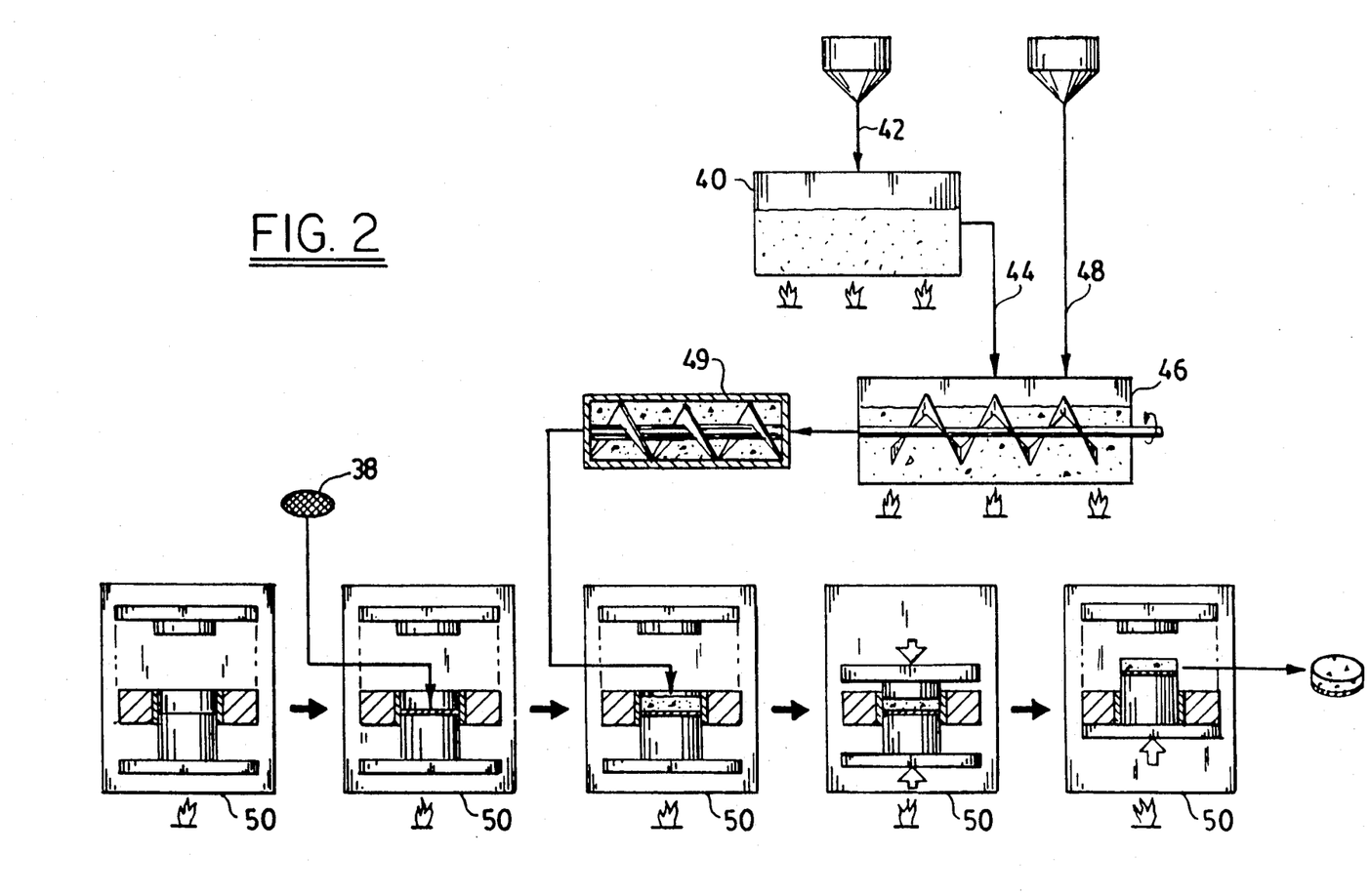

In an alternative process for preparing the porous body of this invention, which is illustrated in FIG. 2, the molecular sieve described above is first transferred to an oven 40 by line 42. In this oven it is preferably heated to a temperature of from about 380 to 420 degrees Fahrenheit.

The heated molecular sieve material is then transferred via line 44 to heated mixer 46. Into heated mixer 46, via line 48, is fed from about 9 to about 20 weight percent of the thermoplastic material (such as the nylon material) described elsewhere in this specification; in this embodiment, nylon 11 is a preferred thermoplastic material. The mixing of the molecular sieve material and the thermoplastic material preferably occurs at a temperature of from about 380 to about 420 degrees Fahrenheit. The components are mixed until a homogeneous mixture is obtained.

The heated mixture from mixer 46 is then transferred to a mold 52 by conventional transfer means such as, e.g., a jacketed auger 49. The mold is heated to a temperature which preferably is from about 10 to about 30 degrees Fahrenheit lower than the temperature of the heated mixture. The hot material thus fed to the mold is then compacted until a molded article with a density of from about 10 to about 25 grams per cubic inch is produced.

PRODUCTION OF A BONDED BODY CONTAINING SUBSTRATE

In one embodiment of this invention, a bonded article comprised of molecular sieve and a substrate is provided.

As used in this specification, the term substrate refers to any material with a composition which is dissimilar to applicants' claimed filter body and which may, for example, consist of one or more metal screens, baffle plates, springs, vessel bodies, ceramically bonded filter dryer components (such as, e.g., those described in U.S. Pat. No. 3,235,089), and the like.

This bonded material may be provided by either of two processes. In the first process, where the molecular sieve is mixed with wetting agent and binder, the substrate component is placed into the mold into which the mixture of molecular sieve/thermoplastic material/water/coating agent is to be charged. Thereafter, such mixture is charged to the mold, pressed, removed from the mold (together with the substrate part with which it is contiguous) and fired as described above.

In the second process, in which the molecular sieve material is preheated, the substrate part is placed into the heated mold into which the molten mixture of molecular sieve and thermoplastic material is to be charged. The combination of substrate/molecular sieve/thermoplastic material is compacted as before.

It will be appreciated that, with the inclusion of the substrate component in the mold or press, the final density to which the green body is pressed or molded may differ from the density desired when no such substrate part is in the mold or press. Thus, when applicants refer to a green body density and/or a compacted density, they are referring to the density of the molecular sieve/thermoplastic material component and not that of the substrate component. Those skilled in the art are well aware of means for measuring and determining the density of the molecular sieve/thermoplastic material component.

In one preferred embodiment, illustrated in the Figures, the substrate material is comprised of metal. Any metal material, in substantially any shape, may be introduced into the mold. Thus, by way of illustration and not limitation, one may use metal screen, metal plates, metal baffles, metal springs, and the like. Some preferred metals include aluminum, steel, copper, alloys thereof, and the like.

In place of, or in addition to the metal material, the substrate may contain ceramically bonded ceramic material. Thus, referring to the Figures, if such a bonded ceramic material is used as substrate 38, a composite material containing a ceramically bonded ceramic portion and a molecular sieve portion may be formed.

In one embodiment, a composite filter body is prepared which is comprised of both the molecular sieve filter body and, bonded thereto, another ceramic filter body.

The other ceramic filter body, which may be used as substrate 38, may be an adsorbent filter body comprised of at least about 50 weight percent of activated alumina. Such a filter body is described in U.S. Pat. No. 3,235,089, the disclosure of which is hereby incorporated by reference into this specification. In one aspect of this embodiment, adsorbent filter body 38 contains at least about 75 weight percent of activated alumina.

Other materials may be used as substrate 38. One of the unique properties of the mixture of nylon and molecular sieve material is that it adheres to these other substrates just as readily as it adheres to metal and ceramic materials, forming a strong bond with such substrates. Thus, by way of illustration, such other substrate material 38 may be wood, plastic, and the like.

THE FILTER BODY OF THIS INVENTION

The molecular sieve filter body produced by the process of this invention will generally have a density of from about 10 to about 15 and, preferably, from about 14 to about 25 grams per cubic inch. It usually will contain from about 9 to about 20 weight percent of thermoplastic material (and, preferably, from about 9 to about 14 weight percent of the thermoplastic material) and at least about 75 weight percent of the molecular sieve material. It is preferred that the filter body contain at least about 85 weight percent of the molecular sieve material.

The molecular sieve filter body produced by applicants' process generally has a compressive strength of at least about 500 pounds per square inch, and preferably, from about 500 to about 1,000 pounds per square inch. The compressive strength of such filter body may be measured on a Carver Laboratory Press, Model Number 2901, equipped with a pressure gauge (Fred S. Carver, Inc., Summit, N.J.). The filter body to be tested is placed on the platen of the press, and the plunger is forced into it until the sample breaks, at which point the compressive strength is noted.

The molecular sieve filter body of this invention has pressure drop of from about 5 inches (water column) to about 20 inches (water column), at a flow rate of 100 standard cubic feet per hour, when the filter body tested is a disc 0.5 inches thick with a diameter of 1.675 inches, and when the filter body tested is mounted in the test apparatus so that the surface area tested is defined by a circle with a diameter of 1.375 inches. As will be apparent to those skilled in the art, when a filter body with different dimensions and/or geometry is tested, one can calculate what pressure drop it would have had if it had the dimensions and geometry of said disc. The filter body is tested accordance with A.S.T.M. standard test F-778-82, "Gas Flow Resistance Testing of Filtration Media."

The molecular sieve filter body of this invention has a water capacity which is substantially greater than the water capacity of prior art filter bodies. As is known to those skilled in the art, the water capacity of a filter body is a measure of its ability to adsorb water molecules from refrigerant fluid. Thus, the term water capacity, as used in this specification, refers to weight gain experienced by the filter body under certain controlled test conditions.

In the water capacity test, a cell which is approximately 18"×8"×18" is provided. Such a cell may be purchased from the Contamination Control Incorporated Company of Kulpsville, Pa. 19443; it consists essentially of "LEXAN" plastic (a thermoplastic carbonate-linked polymer produced by reacting bisphenol A and phosgene which is sold by the General Electric Company).

Into the cell is placed a hygrometer to measure relative humidity and temperature. A Dickson hygrometer (available from The Dickson Company of Addison, Ill. 60601) is used in the test. Both temperature and relative humidity are monitored during this test.

Into the cell are charged at least one vessel containing at least about 800 milliliters of supersaturated lithium chloride solution. Thus, e.g., one may mix 800 grams of anhydrous lithium chloride per 1000 milliliters of water to prepare such supersaturated solution.

After the supersaturated lithium chloride solution has been placed into the cell, the cell is allowed to reach equilibrium over a period of at least about 24 hours. At equilibrium, the relative humidity in the cell is held at about 15 percent and the temperature is held at about 75 degrees Fahrenheit.

The filter body to be tested is first activated by being heated to a temperature of 450 degrees Fahrenheit until it contains less than about 0.5 weight percent of water. The activated filter body to be tested is then weighed. Thereafter, it immediately is placed into the cell for five days. Each 24 hour interval, the material is weighed, and the percent water pickup is recorded. The water pickup is described by the formula:

$$W.P. = Wt - Wi/Wi \times 100.$$

wherein W.P. is the water pickup of the material (in percent), Wt is the weight of the sample at the time it is tested, and Wi is the initial weight of the activated material, prior to the test.

The water pickup of the filter body of this invention is at least about 100 percent greater than the water pickup of the prior filter dryer bodies. Thus, whereas the water pickup of the filter body of this invention is from about 11 to 13.5 percent, the water pickup of prior art activated alumina-molecular sieve filter-driers is only from about 3.5 to about 6.5 percent.

The filter body of this invention has a rate of water pickup which is substantially superior to the rate of water pickup of prior art filter bodies. Within the first 24 hours of the water adsorption test described above, it will pick up at least about 6 percent of water.

The molecular sieve filter body of this invention, when formed and heated in contact with metal or other substrate in accordance with the procedures described elsewhere in this specification, forms a bond of great strength.

In another embodiment of this invention, the filter body of this invention is used in a gas chromatograph.

The process of this invention may be used to prepare molecular sieve filter bodies using molecular sieves with different properties than the ones used for filter-dryer bodies for presently used refrigerant fluids. By way of illustration, one may use as a starting material a molecular sieve which has a pore size greater than 4 angstroms and/or has a particle size such that substantially all of its particles are between 1 micron to about 2,000 microns.

USE OF A SOLUBLE NYLON REAGENT

In one preferred embodiment, the molecular sieve material is mixed with a soluble nylon reagent. In this embodiment, the nylon may act as both a green binder and a means for providing a bond system; thus, one need not utilize additional green binder.

In one embodiment, a gel of a nylon copolymer in alcohol is provided. In this embodiment, one may use a nylon copolymer such as nylon 6,6, nylon 6,12, and the like. The nylon is preferably ground so that substantially all of its particles are less than about 100 microns. The nylon powder thus produced is mixed with an alcohol of the formula ROH wherein R is from about 1 to about 5 carbon atoms. The alcohol/nylon mixture thus formed is then heated to dissolve the nylon in the alcohol; heating may be effected, e.g., by mixing the nylon and alcohol in a Waring Blender at a high speed. The solution is then cooled, thereby forming a gel.

The gel thus produced may be used in place of the Nylon in either of the aforementioned embodiments of applicant's process. Thus, for example, it may be mixed with wetted sieve. It is preferred, however, to mix it with activated sieve.

In the embodiment where the gel is mixed with activated sieve, the sieve, as purchased from the vendor, is generally activated.

The mixture of the activated sieve and the nylon solution may be charged into a die or mold. Once a green body is formed, the alcohol is removed from the body by conventional means. The body may be allowed to dry under ambient conditions. Alternatively, the body may be allowed to dry in a desiccator under vacuum of less than atmospheric pressure. Alternatively, the body may be heated in a vacuum furnace to drive off the alcohol and/or the enhance the bond strength.

In one embodiment, the gel so formed is used as green binder and mixed with powdered nylon and molecular sieve. Thus, for example, in this embodiment, a gel comprised of nylon copolymer may be added to a mixture of molecular sieve and nylon 11 homopolymer.

In another embodiment, homopolymer nylons (such as, e.g., nylon 11, nylon 12, and nylon 6) are dissolved in n-butanol at the boiling temperature of butanol and about 1 atmosphere of pressure to provide a green body binder and/or a substitute for the thermoplastic material.

In another embodiment, the molten mixture of nylon and molecular sieve, instead of being conveyed to a mold, is fed through an extruder, wherein it is formed by a die. By this process, honeycomb filter bodies may be formed which may be useful in, e.g., catalysis of ozone.

The following examples are presented to illustrate the claimed invention but are not to be deemed limitative thereof. Unless otherwise specified, all parts are by weight and all temperatures are in degrees centigrade.

EXAMPLE 1

100 grams of a molecular sieve material identified as "type 4AXH6" (obtained from U.O.P. Molecular Sieves of 25111 Country Club Boulevard, North Olmstead, Ohio) were mixed with 20 grams of water. The wetted sieve material was then allowed to stand under ambient condition for seven days.

Thereafter, the wetted sieve material was mixed with a binder. This binder was prepared by mixing 15 grams of "DISPAL" 180 colloidal alumina (a boehmite material available from the Vista Chemical Company of Austin, Tex.), 15 grams of the "LE45" silicone fluid emulsion (available from the Union Carbide Corporation of Danbury, Conn.), and 400 grams of water. 26 grams of the binder so produced were mixed with 100 grams of the wetted sieve.

To the mixture of wetted sieve and binder were added 9.5 grams of "CORVEL" Nylon 11 powder (product number 78-1001, sold by the Morton Powder Coatings Company of Reading, Pa.); this powder had a mean particle size of about 50 microns.

The mixture of Nylon 11, wetted sieve, and binder was stirred for about two minutes until the molecular sieve was uniformly coated. Thereafter, 25 grams of the coated sieve material were weighed out and charged into a mold. The mold had a diameter of 1.675 inches and a depth of 2.0 inches.

A die was used to compress the material in the mold to a density of 16.9 grams per cubic inch. The material was pressed in a 3 ton, 8" stroke laboratory hydraulic press using a pressure of 750 pounds per square inch. The green body produced in the press was a disc with an outside diameter of 1.675 inches and a thickness of about 0.585 inches.

The green body was placed into a furnace (model number 59544, manufactured by the Lindberg division of Sola Basic Industries, 304 Hart Street, Watertown, Wis.). It was heated to a temperature of 400 degrees Fahrenheit for 2 hours.

The pressure drop and water capacity of the filter body thus formed were tested. The body had a pressure drop of 14 inches (water column) at 100 standard cubic feet per hour. The body also had a water capacity of 14 percent.

EXAMPLE 2

The procedure of Example 1 was substantially followed with the exception that the green binder used was a silica colloid solution identified as "1050" (sold by the Nalco Chemical Company of Chicago, Ill.); two percent of the colloid solution was substituted for the "DISPAL" in the aforementioned mix. The filter body thus produced had properties comparable to that of the body of Example 1.

EXAMPLE 3

The procedure of Example 1 was substantially followed with the exception that the green body was fired for 12 hours in a vacuum furnace at a pressure less than atmospheric and at a temperature of about 450 degrees Fahrenheit. A filter body which was comparable to the filter body of Example 1 was produced.

EXAMPLE 4

100 grams of the type 4AXH6 sieve described in Example 1 were charged to container and heated to a temperature of 410 degrees Fahrenheit; the temperature of the sieve was raised to 410 degrees Fahrenheit over a period of about 30 minutes.

The heated molecular sieve material was mixed with 9.5 grams of the "CORVEL" Nylon 11 material described in Example 1 for about 10 minutes, until an even coating of nylon appeared on the particles of sieve.

The coated sieve material was then weighed to provide a 25 gram sample. This sample was then charged into a heated mold with a diameter of 1.675 inches and a depth of 2.0 inches. The top of the mold was attached, and the molten material was compressed with a pressure of 750 pounds per square inch. Thereafter, the compressed material was cooled by flowing dry air (with a relative humidity of less than 40 percent and at ambient temperature) over the compressed material at a flow rate of 2 standard cubic feet per minute. When the sample had solidified, it was discharged from the mold and placed into a sealed container.

The pressure drop and water capacity of the filter body thus formed were tested. The body had a pressure drop of 16.5 inches (water column) at 100 standard cubic feet per hour. The body also had a water capacity of 13.8 percent.

EXAMPLE 5

The procedure of Example 1 was substantially followed, with the exception that a steel mesh material consisting of 100 mesh steel screen with a diameter of about 1.8 inches was pushed into the mold cavity so that it covered the bottom and a portion of the sides of such cavity; the steel mesh material was placed into the mold cavity prior to the time the mixture of Nylon 11/wetted molecular sieve was charged into such cavity and compressed.

EXAMPLE 6

In substantial accordance with the procedure of Example 5, a composite body comprised of an activated alumina portion was prepared.

100 grams of hydrated alumina (type C40, obtained from Aluminum Company of America, Pittsburgh, Pa.) was mixed with 16 grams of an 85 percent aluminum phosphate solution, in accordance with the procedure of U.S. Pat. No. 1,405,884. Thereafter, a disc consisting of said mixture was formed in accordance with the pressing procedure of Example 1.

The green alumina body was fired at a temperature of 750 degrees Fahrenheit for 2 hours. Thereafter, it was allowed to cool.

The fired alumina body was then placed in the mold cavity referred to in Example 5. Thereafter, the sieve/nylon mixture of Example 5 was charged to such cavity, and a composite fired material was then produced in substantial accordance with the procedure of Example 5.

The bond between the alumina and the molecular sieve material was very strong. When a substantial amount of torque was manually applied to the composite filter body, the body broke at a place other than the bond strata. Despite repeated efforts, the bond between the alumina and the sieve material was unable to be destroyed.

EXAMPLE 7

500 grams of denatured ethanol were mixed with 25 grams of nylon copolymer (sold by Atochem North America, Inc. of Philadelphia, Pa.) for 20 minutes; mixing occurred in a Waring Blender at speed of 20,000 revolutions per minute, and during the mixing the temperature of the mixture rose to about 70 degrees Centigrade.

The mixture so formed was allowed to cool to room temperature. Upon cooling, a gel formed.

100 grams of activated molecular sieve, described in Example 1, were mixed with 30 grams of the denatured ethanol. The slurry was then added to a five gram portion of the gel. Thereafter, 9 grams of the nylon 11 material described in Example 1 were added to the mixture.

The mixture was then pressed into a green body and heated in substantial accordance with the procedure of Example 1. A filter body with properties comparable to that obtained in Example 1 was obtained.

It is to be understood that the aforementioned description is illustrative only and that changes can be made in the apparatus, the ingredients and their proportions, and in the sequence of combinations and process steps as well as in other aspects of the invention discussed herein without departing from the scope of the invention as defined in the following claims.

We claim:

1. A filter body comprised of at least about 75 weight percent of molecular sieve material and from about 9 to about 20 weight percent of nylon, wherein said filter body has a density of from about 10 to about 25 grams per cubic inch, a compressive strength of at least about 500 pounds per square inch, a pressure drop of from about 5 to about 20 inches (water column), a water pickup of at least about 11 weight percent, and an initial 24-hour water pickup of at least about 6 weight percent, wherein:
   (a) said molecular sieve has the formula $M_{2/n}O:Al_2O_3:SiO_2$, wherein:
      1. M is a metal ion selected from the group consisting of sodium, potassium, calcium, strontium, barium, cesium, magnesium, and mixtures thereof, and
      2. n is the valence of the metal ion and is selected from the group consisting of 1 and 2;
   (b) substantially all of the pores of said molecular sieve material are smaller than about 4 angstroms; and
   (c) substantially all of the particles of said molecular sieve are larger than 100 microns and smaller than 2,000 microns.

2. The filter body as recited in claim 1, wherein M is selected from the group consisting of sodium, potassium, and mixtures thereof.

3. The filter body as recited in claim 2, wherein said nylon is selected from the group consisting of Nylon-6, Nylon-6,6, Nylon-6,9, Nylon-6,12, Nylon-11, and Nylon-12.

4. The filter body as recited in claim 3, wherein said nylon is Nylon-6,6.

5. A process for preparing the filter body recited in 1, comprising the steps of:
   (a) providing a mixture comprised of at least about 75 weight percent of the molecular sieve material recited in claim 1 and from about 9 to about 20 weight percent of nylon; and
   (b) heating said mixture to a temperature of from about 325 to about 550 degrees Fahrenheit.

6. The process as recited in claim 5, wherein said mixture of molecular sieve material and nylon also is comprised of from about 1 to about 3 weight percent of green binder.

7. The process as recited in claim 6, wherein said mixture of molecular sieve material and nylon also is comprised of from about 0.5 to about 4 weight percent of silicone fluid emulsion.

8. The process as recited in claim 7 wherein, prior to time said mixture is heated to a temperature of from about 325 to about 550 degrees Fahrenheit, it is pressed into a green body.

9. The process as recited in claim 8, wherein said mixture is heated until it contains less than about 0.5 weight percent of moisture.

10. The process as recited in claim 5, comprising the steps of heating said molecular sieve material to a temperature of from about 380 to about 420 degrees Fahrenheit. and thereafter mixing said heated molecular sieve material with said nylon.

11. The process as recited in claim 10, wherein, said molecular sieve material is mixed with said nylon material while said materials are heated to a temperature of from about 380 to about 420 degrees Fahrenheit.

12. The process as recited in claim 11, wherein, after said mixture of said molecular sieve material and said nylon has been provided, it is fed into a mold.

13. The process as recited in claim 12 wherein, after said mixture has been fed into said mold, it is then compacted in said mold until a molded article with a density of from about 10 to about 25 grams per cubic inch is produced.

14. A composite body consisting essentially of a metal material bonded to the molecular sieve filter body recited in claim 1.

15. The composite body as recited in claim 14, wherein metal material is a metal screen.

16. The composite body as recited in claim 14, wherein said metal material is a metal plate.

17. A composite body consisting essentially of an activated alumina filter body bonded to the molecular sieve filter body recited in claim 1.

* * * * *